(12) United States Patent
Laflamme

(10) Patent No.: US 10,994,377 B1
(45) Date of Patent: May 4, 2021

(54) METHOD FOR MANUFACTURING A RAILCAR BODY

(71) Applicant: Bombardier Transportation GmbH, Berlin (DE)

(72) Inventor: Martin Laflamme, Levis (CA)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 17/074,796

(22) Filed: Oct. 20, 2020

(30) Foreign Application Priority Data

Oct. 21, 2019 (EP) .................................... 19204307

(51) Int. Cl.
| | |
|---|---|
| B23P 15/00 | (2006.01) |
| B23K 31/02 | (2006.01) |
| B61D 17/04 | (2006.01) |
| B23K 26/244 | (2014.01) |

(52) U.S. Cl.
CPC .............. *B23P 15/00* (2013.01); *B23K 31/02* (2013.01); *B61D 17/043* (2013.01); *B23K 26/244* (2015.10); *Y10T 29/49622* (2015.01)

(58) Field of Classification Search
CPC .. B23K 31/02; B23K 26/21; B23K 2101/006; B23K 2101/12; B23K 2101/185; B23K 2103/04; B23K 2103/05; B23K 2103/10; B23K 26/242

USPC ............ 29/897.2, 243.5, 243.53, 714, 281.1; 296/191, 184.1, 146.5, 187.01, 190.08, 296/29, 26.11, 26.1, 204, 192
See application file for complete search history.

(56) References Cited

U.S. PATENT DOCUMENTS 9,021,703 B2 * 5/2015 Garceau ................. B62D 25/06
                                                            29/897.2
9,932,049 B2 4/2018 Kato et al.

FOREIGN PATENT DOCUMENTS

| EP | 3254923 A1 | 12/2017 |
|---|---|---|
| JP | 201083214 A | 4/2010 |
| WO | 9700152 A1 | 1/1997 |

OTHER PUBLICATIONS

Gerhard et al., "Experience Report eSIE.CAR—Modular Carbody-Concept for Economical Future Regional Trains-Sets.", Zevrail Glasers Annalen, Oct. 2005, pp. 404-413.

* cited by examiner

*Primary Examiner* — D Glenn Dayoan
*Assistant Examiner* — Sunsurraye Westbrook
(74) *Attorney, Agent, or Firm* — The Webb Law Firm

(57) ABSTRACT

A method for manufacturing a railcar body includes assembling an underframe assembly, side walls, a roof and end walls made from laser cut sheet and plate components where the assemblies made from sheet components are robotically laser welded by solely using melt-through welds and where the assemblies made from plate components are robotically laser welded using solely butt welds.

14 Claims, 8 Drawing Sheets

METHOD FOR MANUFACTURING A RAILCAR BODY

CROSS-REFERENCE TO RELATED APPLICATION

This application claims priority to European Patent Application No. 19204307.3 filed Oct. 21, 2019, the disclosure of which is hereby incorporated by reference in its entirety.

FIELD OF THE INVENTION

The present invention generally relates to the field of rail vehicles. More specifically, the invention relates to a method for assembling a rail vehicle.

BACKGROUND OF THE INVENTION

Railcar bodies are manufactured in different ways which typically involve assembling aluminum or steel components either by welding or by using through fasteners such as bolts. Because welding operations require that welded components be located in close proximity and because welding generates much heat inducing distortion in welded components, it is necessary to use tooling in which the components to be welded are held in place before, during, and after the welding operation. Such tooling translates in increased production cost, especially considering that railcar bodies are large assemblies manufactured in relatively small quantities, thereby translating in large expensive tooling that cannot be amortized over a large production run.

European patent no. 3 254 923 to Roll et al. discloses a method of assembly of a railcar body structure where through fasteners are used to join a panel to a chassis.

U.S. Pat. No. 9,932,049 to Kato et al. discloses a method of assembly of a railcar body structure where through fasteners are used to join the different sub-assemblies of the railcar body together.

A through fastener is a fastener that passes completely through at least one wall of each one of two adjacent components and that joins these two adjacent components by tightening a first flanged element of the through fastener against a second flanged element placed behind the two adjacent components. Although using such through fasteners does not induce heat distortion as occurs with welding, it adds substantial weight to the assembly and in most cases still requires tooling to ensure precise positioning.

There is therefore a need for an improved railcar body production method.

SUMMARY OF THE INVENTION

It is an object of the present invention to provide a method of manufacturing a railcar that overcomes or mitigates one or more disadvantages of known methods of manufacturing railcars, or at least provides a useful alternative.

The invention provides the advantages of being cheaper to manufacture a railcar since no tooling is required during assembly and welding operations.

In accordance with an embodiment of the present invention, there is provided a method for manufacturing a railcar body comprising:
a) providing a plurality of robotically laser cut metal sheet components where each one of the plurality of sheet components have a laser cut alignment hole;
b) manufacturing an underframe, a first side wall, a second side wall and a roof by:
   I. partially overlapping each sheet component of a first subset of the plurality of sheet components with another sheet component of the first subset, thereby defining overlapping pairs of sheet components and corresponding first lap joints;
   II. aligning alignment holes of each overlapping pair of sheet components in their common first lap joint;
   III. securing the overlapping pairs of sheet components using fasteners inserted in the aligned alignment holes. The fasteners are operative to secure along three orthogonal axes the sheet components of the first subset, thereby avoiding the use of tooling to hold together the sheet components of the first subset;
   IV. robotically laser welding the pairs of overlapping sheet components in the first lap joints;
c) providing an end frame;
d) assembling an underframe assembly by putting together the underframe with the end frame;
e) providing an end wall; and
f) assembling a body by fastening together the underframe assembly, the first and the second side walls, the end wall and the roof.

Optionally, the method may further comprise:
g) providing a plurality of robotically laser cut metal plate components where each one of the plurality of plate components has a matching assembly feature. Each one of the plurality of sheet components has a first thickness and each one of the plurality of plate components has a second thickness. The first thickness is smaller than the second thickness.

Moreover, step c) further comprises:
   I. mounting each plate component of a second subset of the plurality of plate components adjacently to another plate component of the second subset so that at least one of the matching assembly features of each plate component is engaged with another matching assembly feature of the other adjacent plate component. The matching assembly features are operative to secure in at least four orthogonal directions the plate components of the second subset and thereby avoid using tooling to hold together the plate components of the second subset. Only butt joints and corner joints are created in this mounting step;
   II. robotically laser welding together the plate components of the second subset along at least a portion of the butt joints and the corner joints thereby creating exclusively butt welds;
and step d) further comprises:
   I. partially overlapping the underframe with the end frame, thereby defining a second lap joint;
   II. aligning corresponding alignment holes of the underframe and the end frame in the second lap joint;
   III. securing the end frame with the underframe using fasteners inserted in the aligned alignment holes. The fasteners are operative to secure along three orthogonal axes the end frame to the underframe, thereby avoiding using tooling to hold together the end frame to the underframe; and
   IV. robotically laser welding the end frame to the underframe in the second lap joints, thereby creating exclusively melt-through welds.

Optionally, step e) may comprise manufacturing the end wall by:
   I. mounting plate components of a third subset of the plurality of plate components adjacently so that at least one of the matching assembly features of the adjacent plate component of the third subset of the plurality of plate components are engaged together, the mounting creating exclusively butt joints and corner joints;

II. robotically laser welding together the plate components of the third subset of the plurality of plate components along at least a portion of the butt joints and the corner joints thereby creating exclusively butt welds.

Optionally, step f) may further comprise:

III. partially overlapping the underframe assembly with the first side wall and with the second side wall, partially overlapping the first side wall and the second side wall with the roof, partially overlapping the underframe assembly, the first and the second side walls and the roof with two of the end walls. This defines third lap joints of overlapped sub-assemblies;

IV. aligning corresponding alignment holes of the overlapped sub-assemblies in the third lap joints;

V. securing the overlapped sub-assemblies using fasteners inserted in the aligned corresponding alignment holes. The fasteners are operative to secure along three orthogonal axes the overlapped sub-assemblies, thereby avoiding using tooling to hold together the overlapped sub-assemblies; and VI. robotically laser welding together the overlapped sub-assemblies in the third lap joints, thereby exclusively creating melt-through welds.

Preferably, the step of robotically laser welding the pairs of overlapping sheet components in their common first lap joints comprises welding around a head of each one of the fasteners. Similarly, the step of robotically laser welding the end frame to the underframe in the second lap joints may comprise welding around the head of each one of the fasteners. Also similarly, the step of robotically laser welding together the overlapped sub-assemblies in the third lap joint may also comprise welding around the head of each one of the fasteners.

Optionally, step c) may comprise tack welding the plate components together prior to robotically laser welding together the plate components.

Preferably, the matching assembly feature of each one of the plate components is one of a tenon and a mortise.

More preferably, the end frame is devoid of fillet welds.

Typically, the first thickness is substantially less than 3,175 mm (⅛ inch) while the second thickness is substantially at least 3,175 mm (⅛ inch).

Preferably, the fasteners may be self-tapping screws. The overlapping pairs of sheet components comprise a first sheet component and a second sheet component. The corresponding alignment hole of the second sheet component has a smaller diameter than the corresponding alignment hole of the first sheet component. The method further comprising tapping one of the fasteners in the alignment hole of the second sheet component through the corresponding alignment hole of the first sheet component.

Optionally, the fasteners may be removed once the robotically laser welding is completed.

Preferably, the method is devoid of using tooling.

In accordance with another embodiment of the present invention, there is provided a railcar body manufactured by the method as described above.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a method for manufacturing a railcar body. The method capitalizes on the precision of laser-cut sheet and plate components to use details cut into such sheet and plate components to precisely locate them with respect to each other. The sheet and plate components are locked into place with these laser-cut details so that no external tooling is required to hold the assembled components. They are then robotically laser welded with low heat so that the sheet and plate components do not deform, allowing again to avoid the use of tooling. When laser welding the plate components, only the butt type of weld is used. When laser welding the sheet components, only the spot type of weld is used. Lastly, all welded joints are of either butt type and corner type for the plate components while it is overlapped joints for sheet components. There are no T joints used. Not only does this allows the laser head to reach all areas necessary to be joined, but it also eliminates the need for any joint preparation whatsoever.

Figure 1:
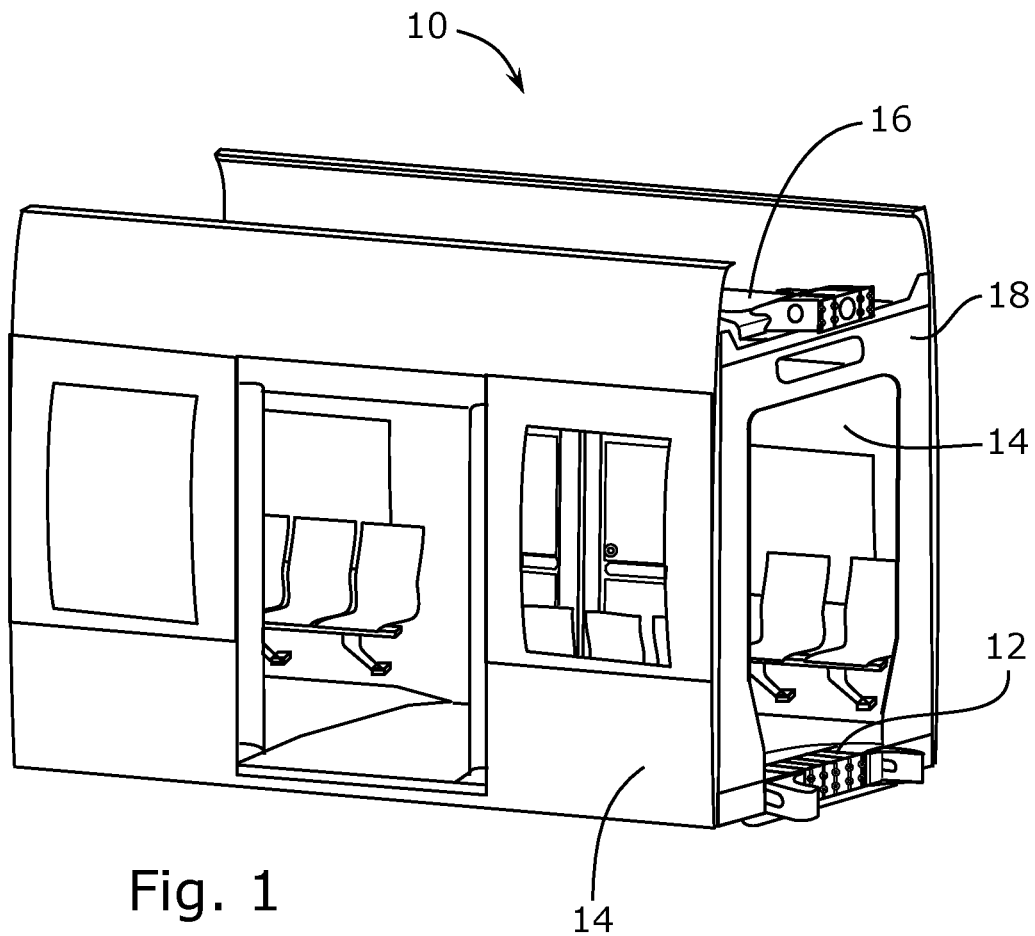
FIG. 1 shows a perspective view of an assembled railcar body in accordance with an embodiment of the present invention.
Figure 2:
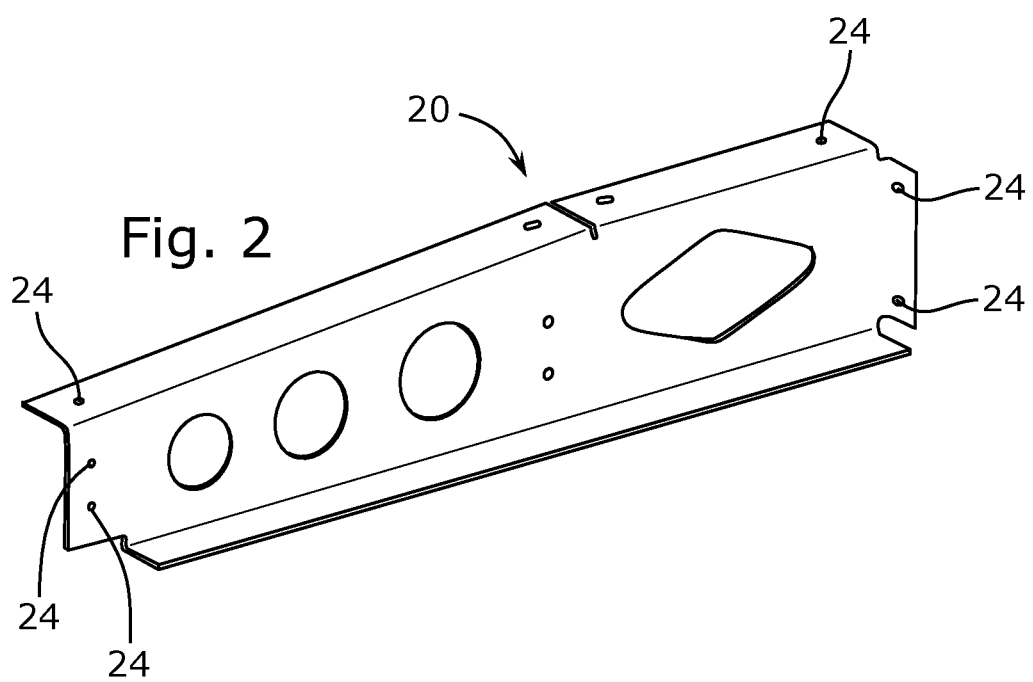
FIG. 2 is a perspective view of a sheet component in accordance with an embodiment of the present invention.
Figure 3:
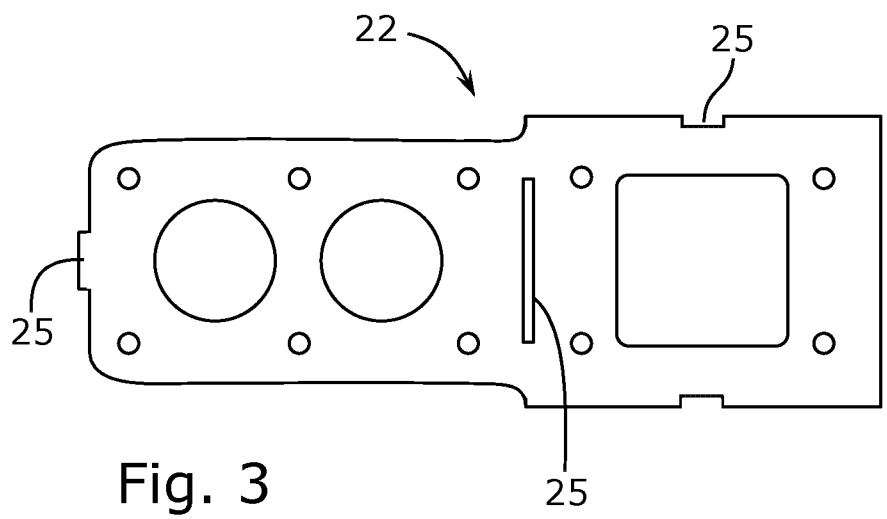
FIG. 3 is a plan view of a plate component in accordance with an embodiment of the present invention.
Figure 9:
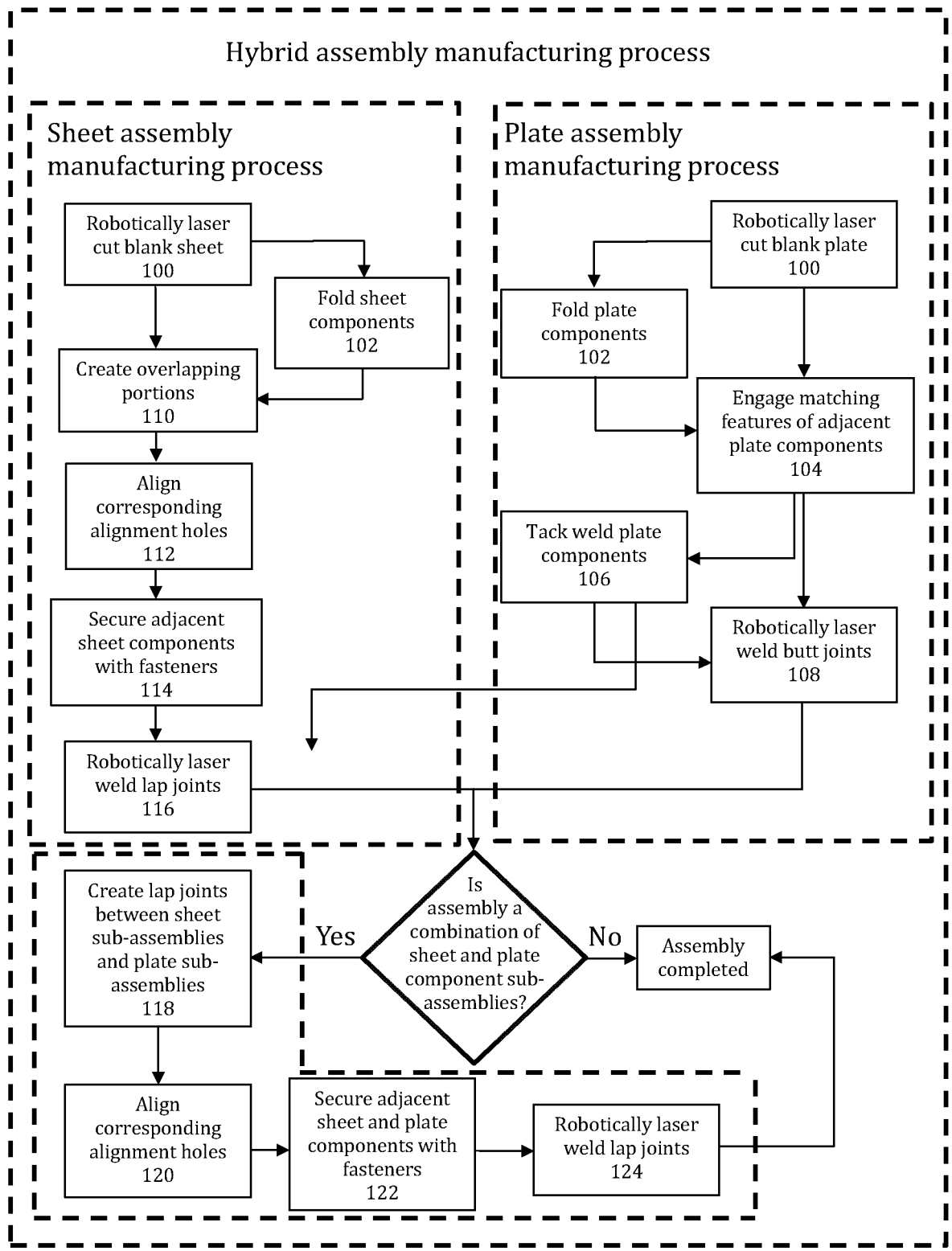
FIG. 9 is a schematic showing a method of manufacturing assemblies used in the assembly of the naked railcar body of FIG. 8.
Figure 10:
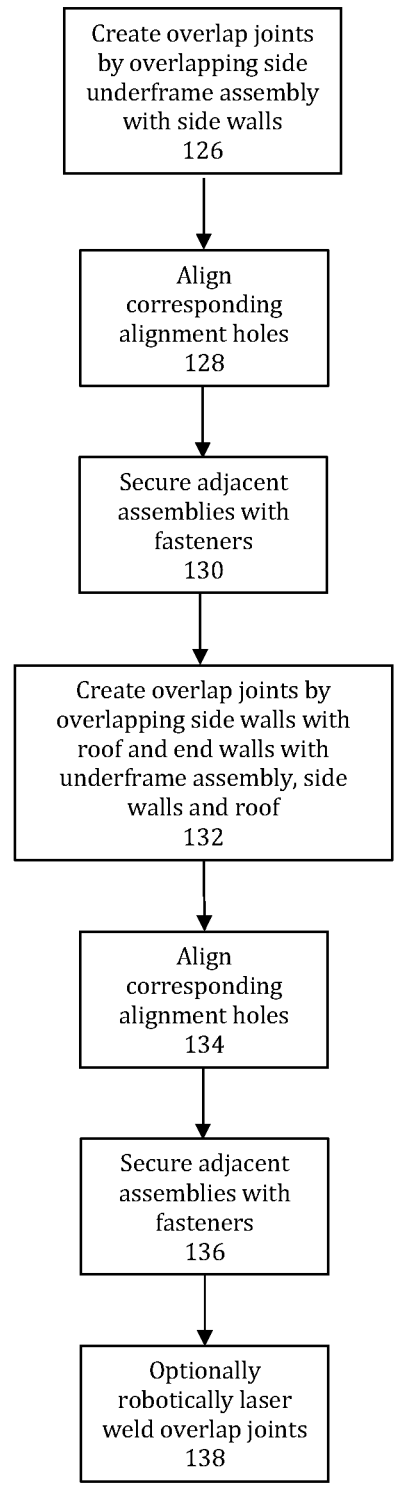
FIG. 10 is a schematic showing a method of assembling the assemblies manufactured with the method depicted in FIG. 9 to produce the naked railcar body of FIG. 8.

FIG. 1 is now referred to where a railcar body 10 is shown. The body 10 comprises an underframe assembly 12, side walls 14, a roof 16 and end walls 18. All these assemblies of the body 10 are made either of laser cut sheet components 20, of laser cut plate components 22 or of a combination of both, best shown in FIGS. 2 and 3 now concurrently referred to. Depending on whether the assemblies are made of sheet components 20, of plate components 22 or of a combination of both, they will be manufactured respectively either from a sheet assembly method, a plate assembly method, or a combination of both called hybrid assembly method, as will be described herein. FIG. 9, showing a schematic of these three assembly methods, is concurrently referred to.

Before any assembly methods may be started, sheet components 20 and plate components 22 must be provided. The sheet components 20 are made of sheet metal that is substantially thinner than 3,175 mm (⅛ inch) while the plate components 22 are made of metal plates substantially equal to or thicker than 3,175 mm (⅛ inch). Note that 3,175 mm (⅛ inch) is not an absolute limit, but is rather based on experience. Consequently, this threshold between the definition of sheet components and plate components should be understood as an approximate guideline rather than a precise measure to be respected. Both the sheet components 20 and the plate components 22 are made by a robot that laser cuts a blank sheet or plate 100 of metal which is then bent or folded 102 as required. In the example shown in FIG. 2, the sheet component 20 is bent whereas in the example shown in FIG. 3, the plate component is flat. Note that this is just an example as it could be the reverse. During the laser cutting operation 100, all details and corresponding assembly features are readily cut in the sheet or plate component 20, 22, including its outline, holes, openings, tabs, notches, slots, or other male-female types of corresponding features. This ensures the required precision of all features of the sheet or plate component 20, 22 so that sheet and plate components 20, 22 may be assembled easily and precisely with each other. For example, laser cutting equipment or robots are capable of a precision in the order of 0.1 mm (0.005 inch). Some of the cut features are present to remove weight from the component whereas other features (the corresponding assembly features) are used to precisely locate the sheet or plate component 20, 22 with respect to another sheet or plate component 20, 22 at a later stage. Such features are corresponding alignment holes 24, typically present in the sheet component 20 and in some plate components 22 as well as matching assembly details 25 typically present in the plate component 22.

The process of manufacturing the railcar body 10 therefore first involves providing, by laser cutting and folding/bending, at least all required sheet and plate components 20, 22 to assemble the floor 12, two side walls 14, the roof 16 and two end walls 18. The floor 12, the side walls 14, the roof 16 and the end walls 18 are herein referred to as assemblies. Advantageously, the manufacturing of these assemblies may be completed without using any type of external tooling to hold sheet and plate components 20, 22 together as will be further explained later. It may however be useful to use a flat, level working table to assemble sheet and plate components 20, 22 of the floor 12, side walls 14, roof 16 and end walls 18, making it easier to lay one or more major component flat on the working table and then attach the other components to this one, or more, major component. Conveniently, the working table may be provided with wheels, air cushion, or other means enabling to move the working table around.

Figure 4:
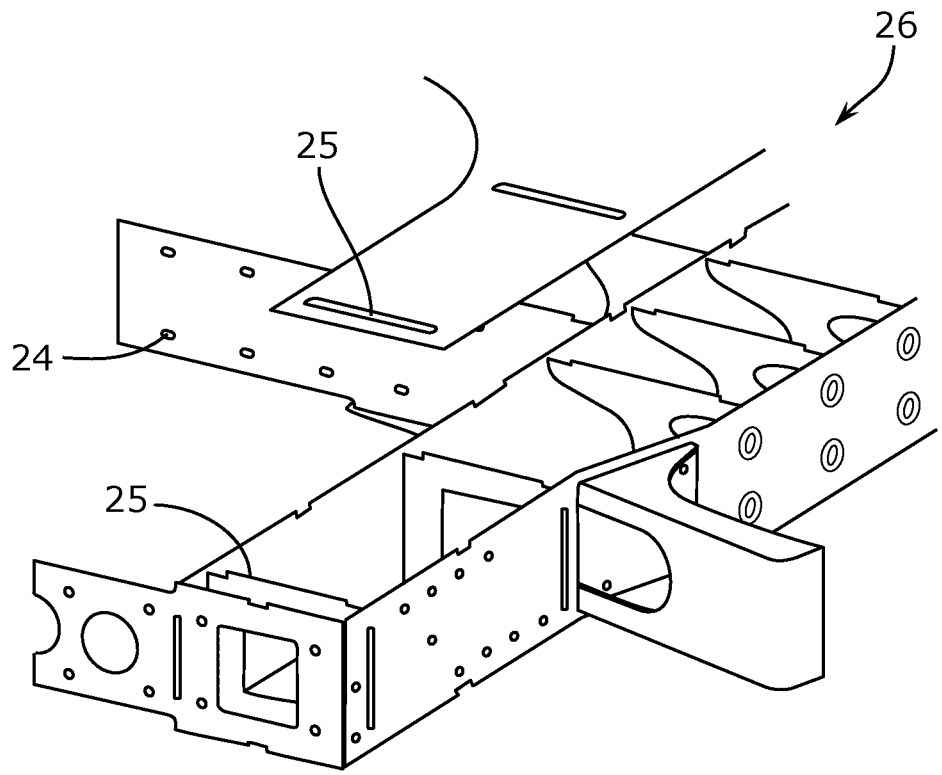
FIG. 4 is an exploded perspective view of an end frame in accordance with an embodiment of the present invention.

The plate assembly method will first be described with concurrent reference to FIG. 4 and continuous reference to FIG. 9. Typically, end frames 26, used at each end of the underframe assembly 12, are manufactured from plate components 22 since they must meet static load cases requirement and then must absorb energy in case of a crash, thereby requiring added strength. These end frames 26 are connected to an underframe 28, itself made from sheet components. The underframe assembly 12 is therefore made using the hybrid assembly method, which comprises both the sheet assembly method and the plate assembly method. One end frame 26 will therefore first be used to illustrate the plate assembly method.

The end frame 26 is assembled by first mounting plate components 22 to one another and by engaging 104 their matching assembly details 25. These matching assembly details 25 are mechanical features such as tongue and groove, mortise and tenon (any type of mortise and tenon: open mortise, stub mortise, wedged-half mortise (dovetail) or through mortise) or any other adequate assembly feature capable of precisely locating two adjacent plate components 22. The matching assembly details 25 are operative to secure in at least four, and possibly five, orthogonal directions the plate components 22. It is understood here that each one of the three orthogonal axes X, Y and Z comprises two opposite directions. Hence, it is possible to slide one plate component 22 having one matching assembly detail with respect to another plate component 22 having an engaged corresponding matching detail in one or two orthogonal directions along one or two orthogonal axes. Although it is possible to disassemble the assembled plate components 22 by sliding one in the opposite direction from which it was assembled (basically, in the direction in which one matching assembly detail 25 cannot significantly retain its adjacent plate component 22), the matching assembly details 25 are designed with a fit allowing to assemble the plate components 22 with each other using a slight force. Such fit may be, for example, a Location or Transition Fit. This precise fit, slightly similar to that used for Lego® blocks and made possible by the precision of the laser cutting process, combined with the design of the matching assembly details 25, make it possible to avoid using external tooling to hold together the plate components 22 prior to a welding operation.

Once all required plate components 22 have been assembled together into the end frame 26, it is possible, although optional, to tack weld 106 at least some plate component 22 with one another to further prevent the plate components 22 from moving respectively to each other during the next step, or to retain together warped plate components 22. Once all required plate components 22 have been engaged with one another, or once the optional tack welding 106 is completed, then the end frame 26, typically supported by its working table, is transferred in a robot welding cell to be robotically laser welded 108.

In its welding cell, the laser welding robot proceeds to weld each plate component 22 on at least a portion of the joint between each pair of adjacent plate components 22. The plate components 22 have been designed to mostly create butt joints when assembled together (whether it is for a flat or a corner joint). Consequently, a robotically-controlled laser welding head is used mostly or solely to create butt welds. Advantageously, avoiding creating fillet welds also contribute to avoiding having recourse to external tooling since fillet welds require heat to be supplied on a larger area and since the fillet tends to pull on the welded parts when it cools down. The welds are created either along the whole thicknesses of two coplanar adjacent plate components 22 or along the whole thickness of a first plate component 22 and along a corresponding portion of a surface of an adjacent perpendicular plate component 22. Advantageously, no joint preparation operation is required since the joints may be laser welded directly as they were laser cut in the laser cutting operation 100. Indeed, the cold wire used with the laser welding process 108 is sufficient to provide a required small quantity of material to complete the joints.

The robot's welding head must of course be provided with adequate power to weld the plate components 22 through their whole thickness, which is typically at least 3,175 mm (⅛ inch). The laser welding head is usually equipped with a camera to detect joint characteristics and adapt parameters of the welding head in real time during the laser welding operation 108. Also, because the laser welding operation is performed by a high precision robot, it is possible to precisely follow the joints to be welded between two adjacent plate components 22. Focusing the laser beam of the welding head on a small area also contributes to avoiding the use of external tooling to hold the plate components 22.

Indeed, conventional welding methods diffuse their heat on a relatively large area, inducing deformations in welded parts if they are not held in place by external tooling. Conversely, laser welding as used in the instant invention does not diffuse its heat on a large area, contributing to avoiding the use of external tooling.

As can be observed, care is taken to produce plate components 22 with precise dimensions and with precise matching assembly details 25 so that plate components 22 may be precisely assembled together. Also, the laser welding process 108 as well as the type of joints and weld (butt joint and butt weld) have been carefully selected because they allow no significant deformation of the plate components 22 during the welding process 108. All these attributes make it possible to manufacture an assembly, such as the end frame 26, made of plate components 22 without any external tooling other than a flat and level surface (ground or table).

Figure 5:
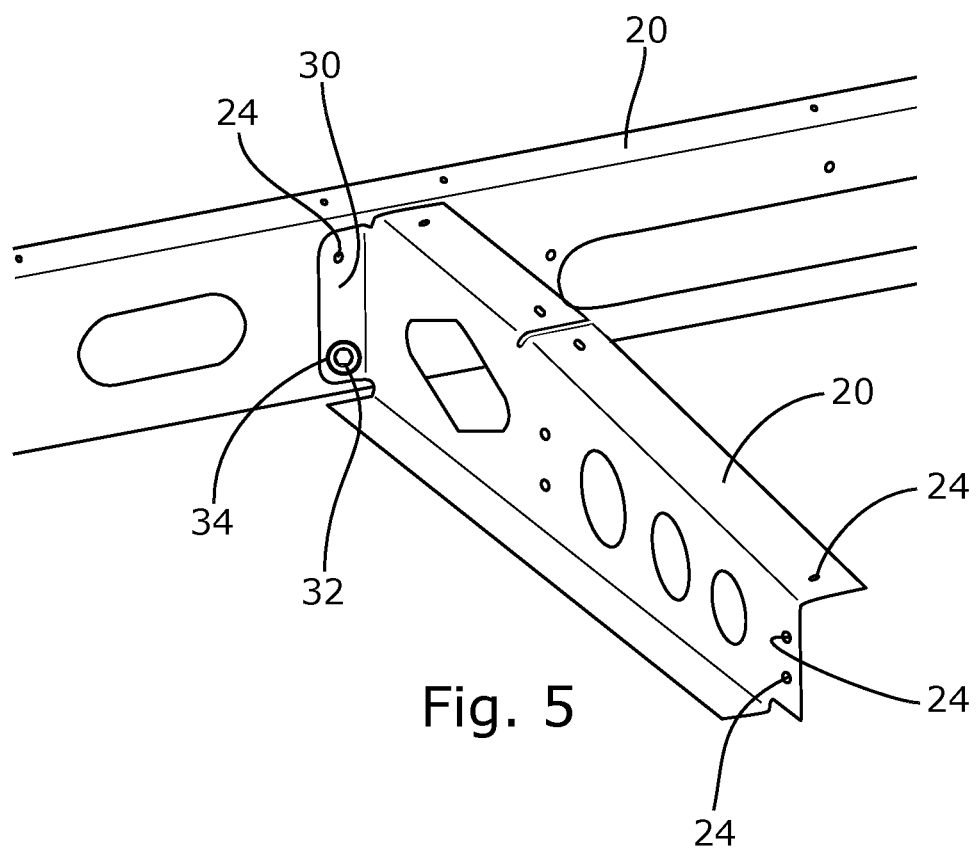
FIG. 5 is a perspective view of a detail of an overlap joint in accordance with an embodiment of the present invention.
Figure 6:
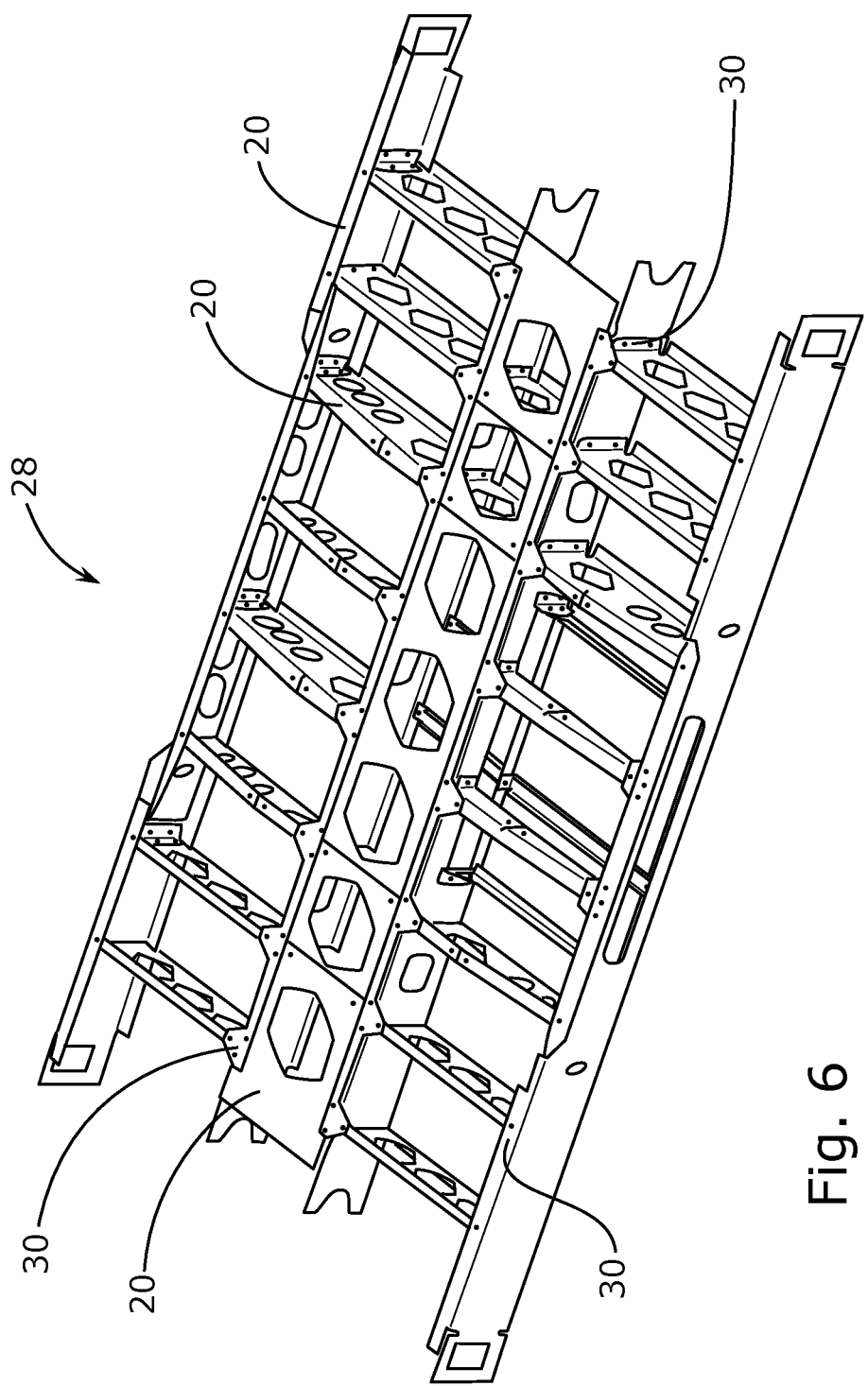
FIG. 6 is a perspective view of an underframe in accordance with an embodiment of the present invention.

Depending on its design, for example whether it is assembled from plate components 22 or sheet components 20, the end wall 18 may be manufactured by using respectively either the plate assembly method as described above or the sheet assembly method which will now be described with concurrent reference to FIGS. 5 and 6.

Typically, the underframe 28, the two side walls 14 as well as the roof 16 are all similarly manufactured using the sheet assembly method since they are all made of sheet components 20. The underframe 28 will therefore now be used to illustrate the sheet assembly method.

Similarly to the assembly of the end frame 26, it may be preferable to assemble the underframe 28 on a flat, level surface such as the moveable working table. In the sheet assembly method, each sheet component 20 is made to at least partially overlap 110 at least one other sheet component 20, thereby defining overlapping pairs of sheet components 20. Each overlapping pair of sheet components 20 has its own corresponding lap joint 30 and each sheet component 20 has at least one matching alignment hole 24 in its lap joint. The corresponding alignment holes 24 of the overlapping pair of sheet components 20 are then aligned 112. This provides a precise orientation and location of the overlapping pair of sheet components 20 with respect to each other. Each sheet component 20 of the assembly being manufactured (the underframe 28 in the present example) is positioned and aligned with respect to another sheet component 20. Consequently, one sheet component 20 may be overlapped by more than one other sheet component and hence, may be part of more than one overlapping pair of sheet components 20 and may comprise more than one lap joint 30.

Once one sheet component 20 has been overlapped with one other sheet component 20 and that the pair of sheet components 20 have been aligned 112 through the corresponding alignment holes 24, the sheet components 20 are locked together 114 by using fasteners 32 inserted in the aligned corresponding alignment holes 24. The fasteners 32 are operative to secure along three orthogonal axes each sheet components 20. Because each sheet component 20 is precisely located with respect to another sheet component 20, it is possible to do without the use of tooling to hold the sheet components 20 together. Although the fasteners 32 may be rivets or bolts, it has been found that self-tapping screws provide the best combination of holding force and precise positioning.

In a pair of sheet components 20, one of the sheet components 20 has a plain hole as its alignment hole 24 while the other sheet component 20 has a slightly smaller alignment hole 24, or an alignment hole 24 having protrusions extending radially towards its center, thereby making an effective portion of the alignment hole 24 with a smaller diameter. When the self-tapping screw is inserted, it is first inserted in the plain alignment hole 24 of the first sheet component 20 so that its threads may catch the smaller alignment hole 24, or the protrusions, to pull both sheet components 20 together.

Once all sheet components 20 of the underframe 28 have been secured together using fasteners 32, the underframe 28 may be transferred in the laser welding cell for being robotically laser welded. In this step, the laser welding robot welds 116 each pair of overlapping sheet components 20 in their lap joints 30. The lap joint 30 is the sole type of weld joint used in the assemblies made of sheet components 20 using the sheet assembly method. The sole type of weld used to weld these lap joints 30 is a melt-through weld where the welding occurs at the interface between both overlapped sheet components 20 through one of them. As depicted in FIG. 5, the laser welding robot creates this weld by encircling each fastener 32. In the present example, a circular weld 34 has been created. Alternatively, any appropriate weld pattern, such as lines, zig-zags, waves, squares, etc, could be created similarly in the lap joint 30. Once all sheet components 20 have been welded, the assembly, in the present case the underframe 28, is complete, as depicted in FIG. 6. Optionally, all fasteners 32 may then be removed.

Figure 7:
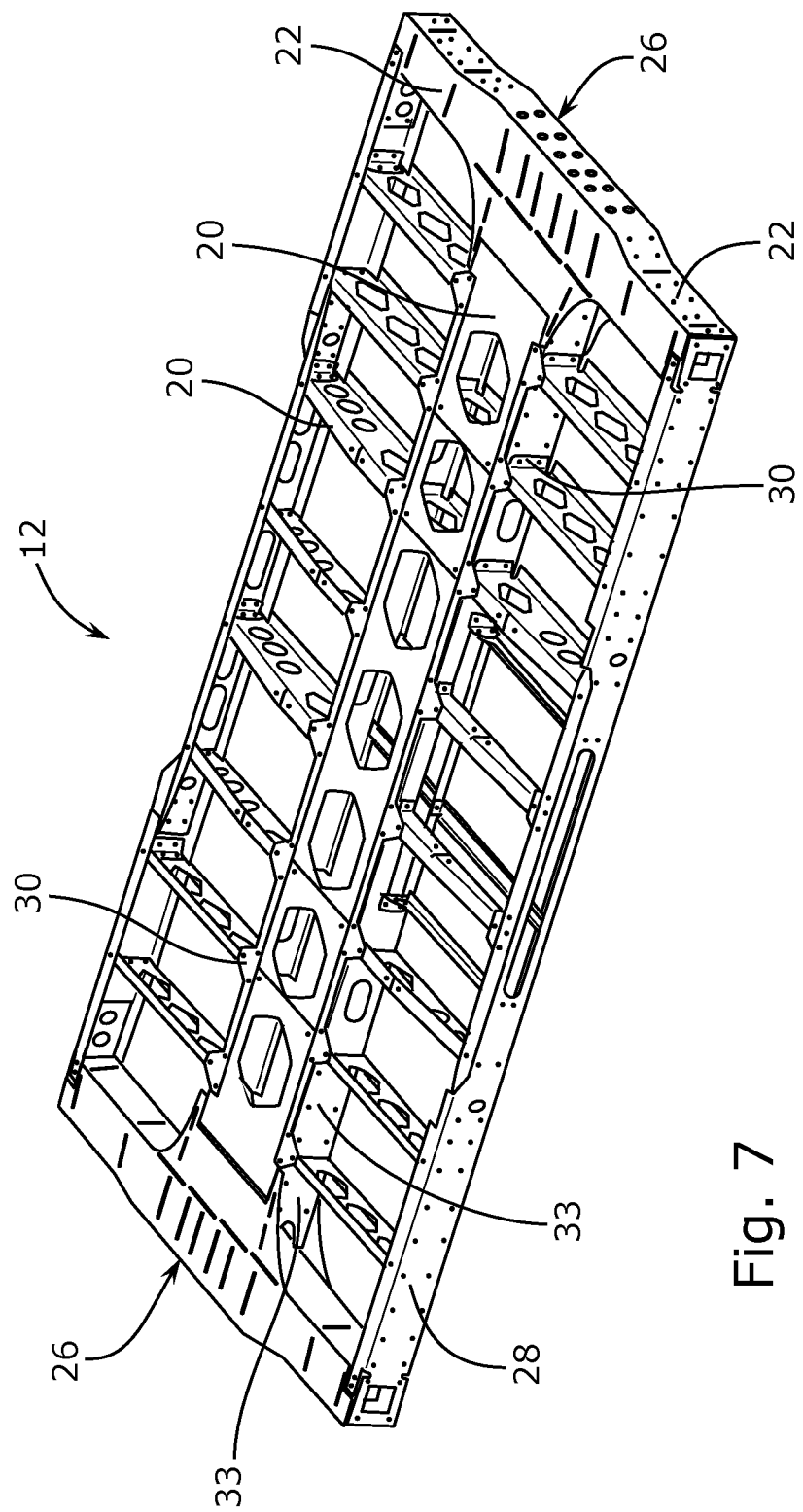
FIG. 7 is a perspective view of an underframe assembly comprising the underframe of FIG. 6 and two end frames of FIG. 4.
Figure 8:
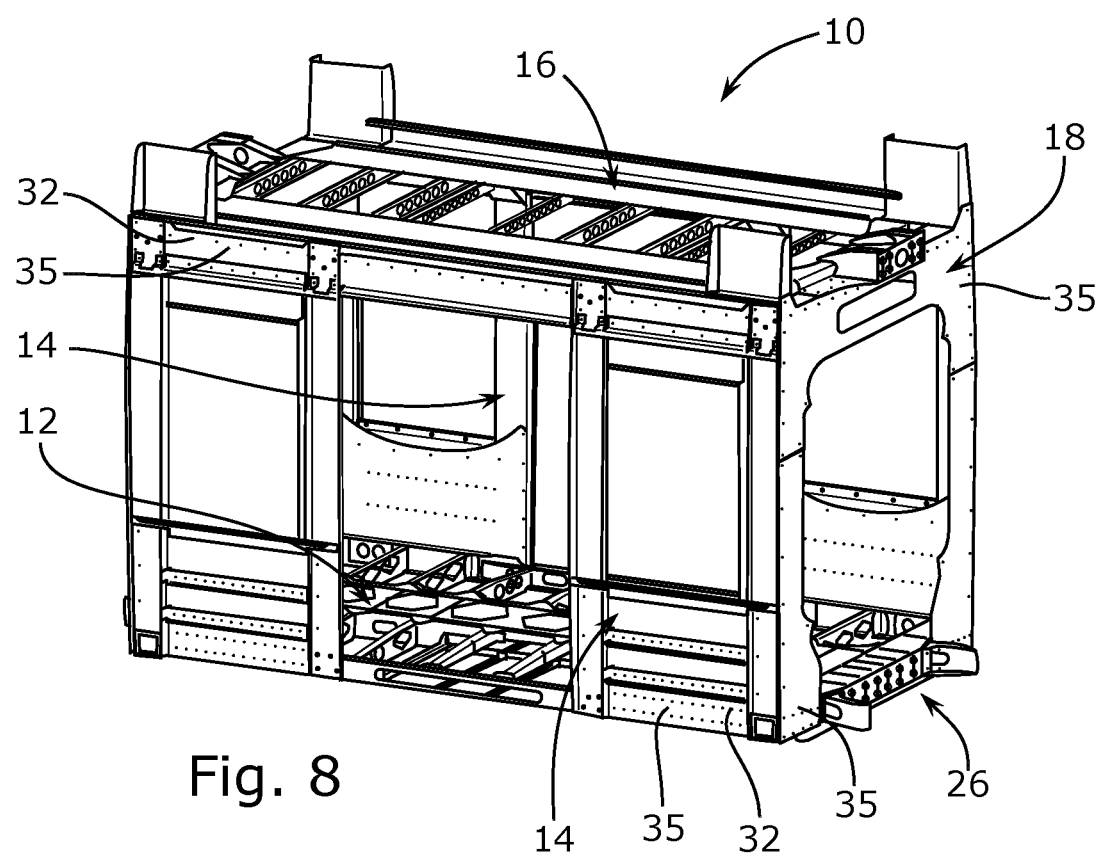
FIG. 8 is a perspective view of a naked railcar body of the assembled railcar body of FIG. 1.

The end frames 26 are typically made using the plate assembly method. The underframe 28, the side walls 14, and the roof 16 are typically made using the sheet assembly method. The end walls 18 are typically made using either one of these methods. The underframe assembly 12, shown in FIG. 7 now concurrently referred to, is assembled by putting together the underframe 28 with at least one end frame 26 at one extremity and is therefore assembled using the hybrid assembly method. The underframe assembly 12 comprises two end frames 26, one at each extremity. The end frames 26 are mounted to the underframe assembly 12 by following a method which is similar to the sheet assembly method. The first step it to overlap 118 the underframe 28 with both end frames 26, thereby defining second lap joints 33. The second lap joints 33 are similar to lap joints 30 except that they occur between one sheet component 20 and one plate component 22. Once overlap 118 is complete, the corresponding alignment holes 24 of the underframe 28 and of the end frames 26 present in the second lap joints 33 are aligned together at 120. Subsequently, the end frames 26 and the underframe 28 are locked in position 122, or secured to each other, by using fasteners 32 inserted in the corresponding alignment holes 24. The fasteners 32 are inserted from the side of one sheet component 20 of the underframe 28 so as to tap in the thicker plates of one plate component 22 of the end frames 26. Finally, the end frames 26 are robotically laser welded 124 to the underframe 28 in the second lap joints 33. Again, the laser welding robot creates melt-through welds, either completely surrounding the fasteners 32, or in any adequate pattern. Finally, the fasteners 32 may be removed or left in place.

The next step is to finally assemble the body 10 from the manufactured assemblies, namely the underframe assembly 12, the side walls 14, the roof 16 and the end walls 18. Although the order of assembling the manufactured assemblies may be varied, the following sequence is recommended. The side walls 14 are first installed by partially overlapping 126 the underframe assembly 12 on each side of the underframe assembly 12, thereby defining third lap joints 35. Next, their corresponding alignment holes 24 are properly aligned 128. Then, fasteners 32 are inserted in the alignment holes 24. The fasteners 32 may be tightened to bring in contact and secure 130 the side walls 14 to the underframe assembly 12. Alternatively, the fasteners 32 may be left loose until the remaining roof 16 and end walls 18 are installed at the next step. The roof 16 and the end walls 18 are then installed, the roof 16 partially overlapping 132 top portion of each side wall 14 in third lap joints 35 while the end walls 18 partially overlap the end portions of the underframe assembly 12, the side walls 14 and the roof 16 in third lap joints 35. Then the corresponding alignment holes 24 between each overlapped assembly are properly aligned 134. Note that the roof 16 may be installed before or after the end walls 18. Following this step, fasteners 32 are installed in the remaining corresponding alignment holes 24 of overlapping portions and then tightened to bring in contact and secure 136 the overlapped assemblies. If the fasteners 32 at the interface between the side walls 14 and the underframe assembly 12 were not tightened, they must be at this point.

At this point, the assemblies (underframe assembly 12, side walls 14, roof 16 and end walls 18) may be robotically laser welded together 138 by laser welding the third lap joints 35 in the same fashion as performed for welding sheet components 20 together. The first lap joints 30, the second lap joints 33 and the third lap joints 35 are all lap joints. The only minor difference is that the third lap joint 35 may be similar to either the first lap joint 30 in that two sheet components 20 are overlapped, or it may be similar to the second lap joint 33 where one sheet component 20 overlaps a plate component 22. Again, at this stage, the type of weld used is the melt-through weld. Optionally, the assemblies may only be fastened together by the fasteners 32. In this case, it is preferable to use permanent fasteners such as Huckbolts® fasteners.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. A method for manufacturing a railcar body comprising:
a) providing a plurality of robotically laser cut metal sheet components where each one of the plurality of metal sheet components has a laser cut alignment hole;
b) manufacturing an underframe, a first side wall, a second side wall and a roof by:
partially overlapping each metal sheet component of a first subset of said plurality of metal sheet components with another metal sheet component of said first subset, thereby defining overlapping pairs of metal sheet components and corresponding first lap joints;
aligning alignment holes of each overlapping pair of metal sheet components in their common first lap joint;
securing said overlapping pairs of metal sheet components using fasteners inserted in said aligned alignment holes, said fasteners being operative to secure along three orthogonal axes said metal sheet components of said first subset, thereby avoiding using tooling to hold together said metal sheet components of said first subset; and
robotically laser welding said pairs of overlapping metal sheet components in said first lap joints;
c) providing an end frame;
d) assembling an underframe assembly by putting together said underframe with said end frame;
e) providing an end wall;
f) assembling the body by fastening together said underframe assembly, said first and said second side walls, said end wall and said roof,
g) providing a plurality of robotically laser cut metal plate components, each one of said plurality of metal plate components having a matching assembly feature, each one of said plurality of metal sheet components having a first thickness, each one of said plurality of metal plate components having a second thickness, said first thickness being smaller than said second thickness;
wherein step c) further comprises:
mounting each metal plate component of a second subset of said plurality of metal plate components adjacently to another metal plate component of said second subset so that at least one of said matching assembly feature of each metal plate component is engaged with another said matching assembly feature of said other adjacent metal plate component, said matching assembly features being operative to secure in at least four orthogonal directions said metal plate components of said second subset and thereby prevent using tooling to hold together said metal plate components of said second subset, said mounting comprising creating exclusively butt joints and corner joints;
robotically laser welding together said metal plate components of said second subset along at least a portion of said butt joints and said corner joints thereby creating exclusively butt welds; and
wherein step d) further comprises:
partially overlapping said underframe with said end frame, thereby defining a second lap joint;
aligning corresponding alignment holes of said underframe and said end frame in said second lap joint;
securing said end frame with said underframe using fasteners inserted in said aligned alignment holes, said fasteners being operative to secure along three orthogonal axes said end frame to said underframe, thereby avoiding using tooling to hold together said end frame to said underframe; and
robotically laser welding said end frame to said underframe in said second lap joints thereby creating exclusively melt-through welds.

2. The method of claim 1, wherein step e) comprises manufacturing said end wall by:
mounting metal plate components of a third subset of said plurality of metal plate components adjacently so that at least one of said matching assembly features of said adjacent metal plate components of said third subset are engaged together, said mounting creating exclusively butt joints and corner joints; and
robotically laser welding together said metal plate components of said third subset along at least a portion of said butt joints and said corner joints thereby creating exclusively butt welds.

3. The method of claim 1, wherein step f) further comprises:
partially overlapping said underframe assembly with said first side wall and with said second side wall, partially overlapping said first side wall and said second side wall with said roof, partially overlapping said underframe assembly, said first and said second side walls and said roof with two of said end walls thereby defining third lap joints of overlapped sub-assemblies;
aligning corresponding alignment holes of said overlapped sub-assemblies in said third lap joints;
securing said overlapped sub-assemblies using fasteners inserted in said aligned corresponding alignment holes, said fasteners being operative to secure along three orthogonal axes said overlapped sub-assemblies, thereby avoiding using tooling to hold together said overlapped sub-assemblies; and
robotically laser welding together said overlapped sub-assemblies in said third lap joints thereby exclusively creating melt-through welds.

4. The method of claim 1, wherein said robotically laser welding said pairs of overlapping metal sheet components in their common first lap joints comprises welding around a head of each one of said fasteners.

5. The method of claim 4 wherein said robotically laser welding said end frame to said underframe in said second lap joints comprises welding around said head of each one of said fasteners.

6. The method of claim 5, wherein said robotically laser welding together said overlapped sub-assemblies in said third lap joint comprises welding around said head of each one of said fasteners.

7. The method of claim 1, wherein step c) comprises tack welding said metal plate components together prior to said robotically laser welding together said metal plate components.

8. The method of claim 1, wherein said matching assembly feature of each one of said metal plate components is one of a tenon and a mortise.

9. The method of claim 1, wherein said end frame is devoid of fillet welds.

10. The method of claim 1, wherein said first thickness is substantially less than 3,175 mm (⅛ inch) and in that said second thickness is substantially at least 3,175 mm (⅛ inch).

11. The method of claim 1, wherein said fasteners are self-tapping screws and in that said overlapping pairs of metal sheet components comprise a first metal sheet component and a second metal sheet component, said corresponding alignment hole of said second metal sheet component having a smaller diameter than said corresponding alignment hole of said first metal sheet component, said method further comprising tapping one said fastener in said alignment hole of said second metal sheet component through said corresponding alignment hole of said first metal sheet component.

12. The method of claim 1, further comprising removing said fasteners once said robotically laser welding is completed.

13. The method of claim 1, wherein said method is devoid of using tooling.

14. A railcar body manufactured by the method of claim 1.

\* \* \* \* \*